United States Patent [19]
Schussler et al.

[11] 3,986,243
[45] Oct. 19, 1976

[54] METHOD OF REPAIRING CHEMICAL PROCESS EQUIPMENT

[75] Inventors: Mortimer Schussler, Buffalo Grove, Ill.; Hibbard G. Keifert, Torrance, Calif.

[73] Assignee: Fansteel Inc., North Chicago, Ill.

[22] Filed: Sept. 22, 1975

[21] Appl. No.: 615,191

[52] U.S. Cl. .................................. 29/401 E; 29/402
[51] Int. Cl.² ............................................ B23P 7/04
[58] Field of Search .............. 29/401, 401 B, 401 C, 29/401 D, 401 E, 403, 402

[56] References Cited
UNITED STATES PATENTS

| | | | |
|---|---|---|---|
| 2,139,590 | 12/1938 | Jessop | 29/522 |
| 2,722,734 | 11/1955 | Grant | 29/401 E |
| 3,551,234 | 12/1970 | Britton | 29/401 |

*Primary Examiner*—C.W. Lanham
*Assistant Examiner*—V. K. Rising
*Attorney, Agent, or Firm*—Dressler, Goldsmith, Clement, Gordon & Shore, Ltd.

[57] ABSTRACT

A method of repairing a wall of chemical process equipment is disclosed which is particularly suitable for repairing a vessel having an outer shell and an inner liner having tantalum as a base constituent wherein the liner has a fault such as a corrosion pit. The fault is repaired by drilling a hole through the fault, liner and shell, the diameter of the hole through the liner being at least as great as the diameter of the fault. A lifting means such as a screw is inserted into the hole to raise the liner away from the shell. The hole through the shell is enlarged, the screw is removed from the liner, and the area between the raised portion of the liner and the shell is cleaned. An insert having tantalum as a base constituent is inserted into the hole, the areas on both sides of the insert are evacuated and purged with an inert gas, and the insert is welded to the liner to form a seal therebetween. A second insert preferably having steel as a base constituent is inserted into the enlarged portion of the hole and is welded to the shell to thereby complete the repair of the wall.

8 Claims, 4 Drawing Figures

METHOD OF REPAIRING CHEMICAL PROCESS EQUIPMENT

BACKGROUND OF THE INVENTION

This invention relates to a method of repairing a wall having two or more layers. More particularly, this invention relates to a method of repairing a wall of chemical process equipment wherein one of the layers has tantalum as a base constituent.

Tantalum and its alloys are commonly used in environments in which their superior corrosion resistance can be relied upon to provide long lived components which are exposed to corrosive solutions such as sulfuric acid, hydrochloric acid, and nitric acid. Thus, tantalum and tantalum alloys are used in chemical process equipment and are frequently used to line vessels containing corrosive solutions. For example, Fansteel "63" Metal, manufactured by Fansteel, Inc., has tantalum as a base constituent and has 2.5 weight per cent tungsten and 0.15 weight per cent columbium, and has high corrosion resistance and excellent strength properties at 390° F. (200° C.) which is a maximum temperature requirement for a number of chemical process industry applications. Its fabricating and welding characteristics are similar to those of commercially pure tantalum.

The outstanding corrosion resistance and inertness of tantalum and its alloys is due to the thin surface film of tantalum pentoxide. When this film is chemically damaged, the underlying metal is attacked. Thus, faults such as corrosion pits may occur in liners having tantalum as a base constituent.

Heretofore, repair techniques for liners having tantalum as a base constituent have not consistently resulted in high quality, contamination-free welds. It has been attempted to remove areas of the liner where corrosion pits have perforated the liner and to weld tantalum patches over these areas. However, severe contamination of the weld areas frequently occurs, particularly underneath the liner, because of residual corrosion products.

As is known, at temperatures in excess of about 400° C., it is necessary to protect tantalum and its alloys against contamination and its tendency to react with gases, vapors and other metals. The high melting point (3,000° C.) of tantalum and its alloys, (such as Fansteel "63" Metal), together with the strong tendency of hot solid or molten tantalum to alloy with, or be contaminated by, other metals, solids and gases, makes it difficult to weld tantalum or its alloys without contamination.

SUMMARY OF THE INVENTION

According to the method of the present invention, a wall having faults such as corrosion pits therein is repaired to consistently produce sound, essentially contamination-free weld repairs of the wall. The method is particularly suitable for repairing the wall of a vessel having an inner layer comprising a liner having tantalum as a base constituent, and an outer layer comprising a shell having steel or another suitable material as a base constituent. The shell is in face-to-face contact with the liner. A fault in the liner is repaired by creating a hole, as by drilling, through the fault, liner and shell, the hole through the liner having a diameter at least as great as the diameter of the fault. A lifting means such as a screw is inserted into the hole from the liner side of the wall to raise the liner away from the shell. The hole through the shell is enlarged to a diameter greater than the diameter of the hole through the liner, and the lifting means is removed from the hole. A first insert is later inserted into the hole and welded to the liner, and a second insert is positioned in the enlarged portion of the hole and welded to the shell.

Since the liner of the chemical process equipment is preferably formed of tantalum or a tantalum alloy, special precautions and procedures are necessary to insure a satisfactory weld. Thus, after removing the screw and before inserting the first insert, it is desirable to use a solvent cleaner to clean the area between the raised portion of the liner and the shell to remove impurities such as hydrocarbon oils or greases, metal chips and oxides to minimize contamination during welding.

Also because tantalum and its alloys have a high melting point and a great affinity at elevated temperatures for metals, solids, and gases, the region containing any tantalum to be heated to purged of contaminating gases and vapors and is filled with an inert atmosphere. The inert atmosphere moves through the welding region so that gaseous impurities are removed from the welding region and discharged. The moving inert atmosphere should be provided before welding it begun and after welding is completed so that the tantalum or tantalum alloy will be heated, will remain hot, and will be cooled in an inert atmosphere down to a safe temperature below about 400° C. The inert atmosphere may be provided by using any one of or a mixture of inert monatomic gases, such as argon, helium, neon, krypton or zenon, argon being preferred.

The first insert is of a material of substantially the same base constituent as the liner. When inserted into the hole, the first insert has a first portion protruding through the hole through the liner and a second portion in juxtaposition with the face of the liner which is directed towards the enlarged hole through the shell. The first insert is then welded to the liner to form a seal therebetween. The second insert is of a material of substantially the same base constituent as the shell, is positioned in the enlarged portion of the hole, and is welded to the shell to form a seal therebetween to thereby repair the wall.

The liners used in chemical process equipment are often of the thermal expansion compensated type, in which case the liners are corrugated. Since faults such as corrosion pits can occur anywhere in the liner, it is a further feature of the method of the present invention that the irregular contour of the liner can be accommodated. For this purpose, the shape of the inserts can be contoured as desired.

DETAILED DESCRIPTION OF THE PREFERRED EMBODIMENT

Figure 1:
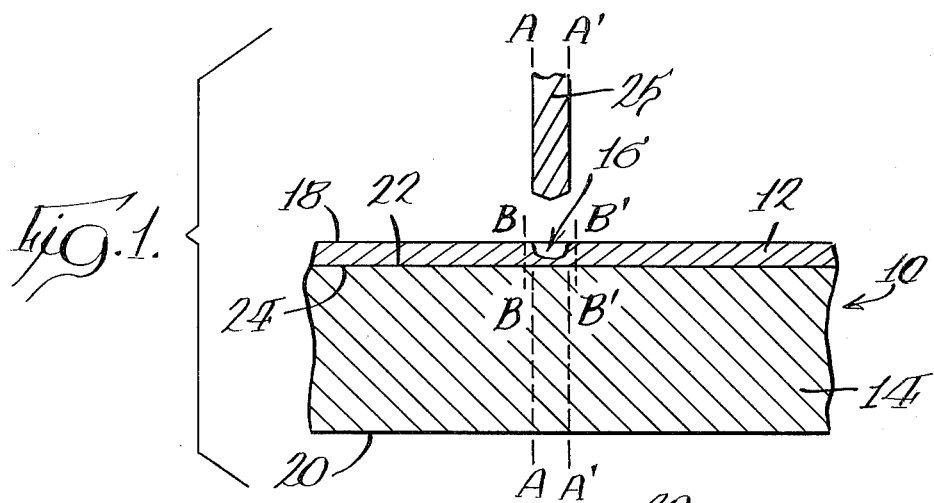
FIG. 1 is a fragmentary cross-sectional view of a wall having an inner liner and an outer shell with a fault in the liner to be repaired.

Referring to the drawings, the wall segment 10 illustrated in the FIGURES is intended to represent a small region of a laminar structure which, for the purpose of appreciating the present invention, can be the wall of a tank or vessel. For example, the wall 10 may be the wall of chemical process equipment, such as a vessel for holding sulfuric acid or hydrochloric acid.

The wall 10 has a layer of first material 12 and layer of second material 14, with the layer of first material 12 having a fault (or faults) 16 therein which is to be repaired. The layer of first material 12 may be an inner liner which has one face 18 defining the inside diameter of the vessel. The liner 12 is preferably corrosion resistant and is preferably formed of tantalum or a tantalum alloy such as those disclosed in commonly assigned U.S. Pat. No. 3,592,639 to Schussler. One particularly suitable material for liner 12 is Fansteel "63" metal, manufactured by Fansteel, Inc., which contains 2.50 weight percent of tungsten, 0.15 weight percent columbium, with the balance being essentially tantalum. Fansteel "63" metal has about 50 per cent higher tensile strength than pure tantalum and shows somewhat superior corrosion resistance than pure tantalum in some environments such as concentrated sulfuric and hydrochloric acid. The layer of second material 14 may be an outer shell which can be formed of steel, is substantially thicker than the liner 12, has one face 20 defining the outside diameter of the vessel, and an opposite face 22 which is in face-to-face relation with the opposite face 24 of the liner 12. The liner 12 and the shell 14 can be bonded together along the entire area thereof, can be spot bonded together, or can be simply in close proximity to one another, depending on the use and construction of the wall 10. Thus, the opposite face 22 of the shell 14 may be in interfacial contact with the opposite face 24 of the liner 12, e.g., at locations where the liner 12 and and the shell 14 are bonded together, or may be in close proximity to one another, e.g., between spot bonds or where the liner 12 and the shell 14 are not bonded together.

The fault 16 may be due to corrosion attack from pit-type corrosion, which can be caused by an essentially anhydrous condition in the chemical process equipment. The faults requiring repair can also result from impurities, defects or mechanical damage in the liner 12.

Figure 2:
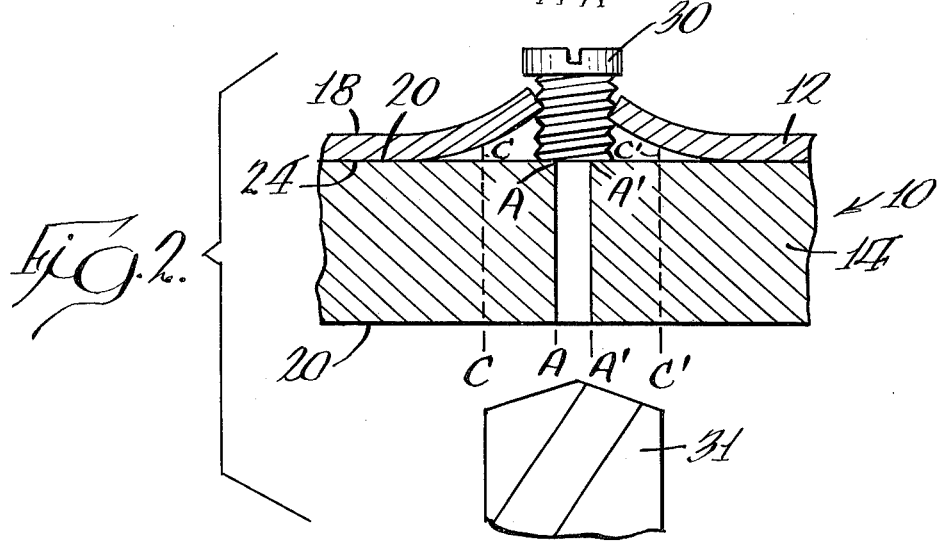
FIG. 2 is a fragmentary cross-sectional view similar to FIG. 1 and illustrating a hole created through the liner and shell with a screw inserted into the hole to raise the liner away from the shell.

When the liner 12 in a tank has faults or corrosion pits 16, the method of the present invention is effective to repair the liner 12. Referring to FIGS. 1 and 2, a hole is created through the fault 16, the liner 12 and the shell 14, the hole through the liner 12 having a diameter at least as great as the diameter of the fault. More specifically, the hole may be created by drilling through the fault 16, the liner 12, and the shell 14 with a drill 25 to define a hole between lines A—A and A'—A', and then enlarging the hole through the liner 12 to a diameter at least as great as the diameter of the fault 16, the enlarged hole being defined between lines B—B and B'—B'.

As illustrated in FIG. 2, the liner 12 is then raised away from the shell 14 adjacent the hole by operating a lifting means such as a screw 30 which is inserted and threaded into the hole. The lifting means is preferably a tantalum screw 30 having a root diameter (minor diameter) which is approximately equal to the diameter of the hole defined between lines B—B and B'—B' in liner 12. The screw 30 is threaded into the liner 12 and cuts its own threading therein. As the screw 30 is turned, it raised the liner 12 adjacent to the hole away from the shell 16. The diameter of the hole through the liner 12 is preferably greater than the diameter of the hole through the shell 14 to limit the insertion of the screw 30 into the hole. Alternatively, the hole through the liner 12 may be the same diameter as the hole through the shell 14 so long as the diameter of the hole is at least as great as the diameter of the fault 16 and (1) the screw is formed of a material softer than the shell 14 so that the screw will not tap into the shell 14, or (2) liner 12 is pretapped to receive the screw 30 which has a slightly larger diameter than the hole.

Figure 3:
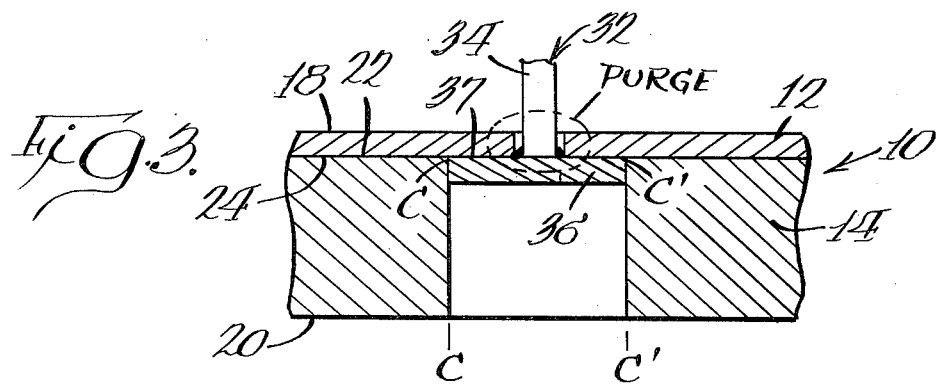
FIG. 3 is a fragmentary cross-sectional view similar to FIG. 1 and illustrating an enlarged hole through the shell and a first insert positioned in the hole and having a portion protruding through the liner.

Referring now to FIGS. 2 and 3, the hole through shell 14 is enlarged to a diameter greater than the diameter of the hole through liner 12, the enlarged portion of the hole being defined between lines C—C and C'—C'. It is important to prevent injury to liner 12. Thus, the screw 30 raises liner 12 away from shell 14 in the vicinity of the hole, and the drill which enlarges the hole through the shell 14 engages screw 30 without contacting the liner 12. The drill 31 (FIG. 2) which enlarges the hole through shell 14 may be provided with a collar to control the depth of the drilling.

The screw 30 deforms the liner 12 to an outwardly bent condition. The screw 30 is then removed from the hole, and the area between the raised portion of liner 12 and shell 14 adjacent to the hole is cleaned with an industrial type of organic solvent cleaner to remove impurities such as hydrocarbon oils or greases, metal chips and oxides that may be present at the interface between the liner 12 and the shell 14 and which can cause contamination during welding (discussed below). The cleaned area is subsequently wiped and dried.

A first insert 32 is positioned in the hole and has a first portion 34 protruding through the hole through liner 12 and a second portion 36 having a face 37 in juxtaposition with face 24 of liner 12. The insert 32 is a material of substantially the same base constituent as liner 12, and is preferably the same material as liner 12, although pure tantalum is also acceptable where the liner 12 is a tantalum base alloy. The first portion 34 may comprise a rod of material which is tack welded to a disc of material which is sized to snugly fit within the enlarged portion of the hole and comprises the second portion 36 of the insert 32. The first insert 32 is inserted into the hole from the shell side of the wall 10, and the outwardly bent portion of liner 12 is forced flush with shell 14 and the second portion 36 of the first insert 32.

Tantalum is very electropositive in the electromotive series, and becomes cathodic when in contact with most other metals. Because of its cathodic behavior, atomic hydrogen is liberated and absorbed by tantalum, resulting in hydrogen embrittlement. Therefore, when tantalum is used in chemical process equipment, care should be taken so that it does not become cathodic. It is, therefore, desirable that screw 30 be formed of tantalum to prevent contamination of the liner 12 when it is welded (as discussed below). Additionally, adequate cleaning of the tantalum material and inert gas shielding are mandatory in welding tantalum. Tantalum and tantalum alloys can successfully be welded to yield joints using either inert gas shielded tungsten arc welding, or electron beam welding.

Figure 4:
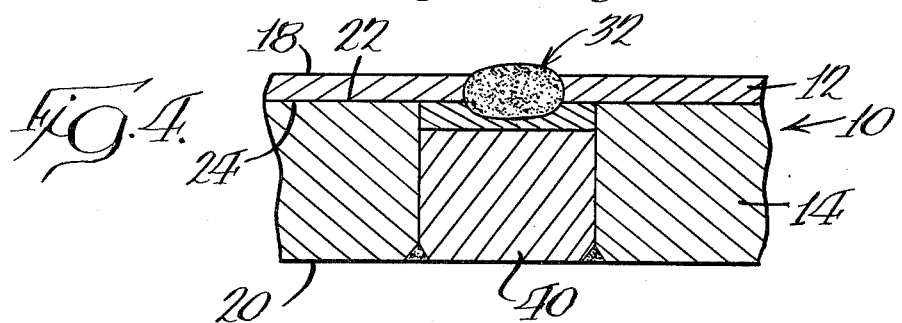
FIG. 4 is a cross-sectional view similar to FIG. 1 and illustrating the first insert welded to the liner and a second insert positioned in the enlarged portion of the hole and welded to the shell.

By suitable means, the region inside the repair area is evacuated and purged with an inert gas. For example, a plastic sheet or bag can be taped to the face 18 of the liner 12 adjacent to the hole to loosely position the bag over the weld area. A hose is fitted against shell 14 along the enlarged portion of the hole and an inert gas such as argon is supplied through the hose to inflate and "purge" the bag and the space between liner 12 and shell 14. A hole is created in the bag to permit oxygen to exit, and the argon is supplied continuously to flush out the oxygen. A second hole is created in the bag, and a torch is inserted into the second hole to weld the first insert 32 to the liner 12. If desired, tantalum filler may be added, or any excess of the first portion 34 of the first insert 32 beyond the weld can be removed. The weld forms a seal between first insert 32 and liner 12, as shown in FIG. 4.

The flow of argon through the hose is discontinued after the welded area between the first insert 32 and liner 12 cools, and the hose is removed from shell 14. A second insert 40 of a material of substantially the same base constituent as the shell 14 is positioned in the enlarged portion of the hole between lines C—C and C'—C', and is welded to shell 14 to form a seal therebetween. The insert 40 preferably comprises a steel plug which snugly fits into the enlarged portion of the hole. It is unnecessary to weld second insert 40 to shell 14 in an inert gas atmosphere because steel can be welded at much lower temperatures than tantalum. The completely repaired wall 10 is illustrated in FIG. 4.

EXAMPLE

Liners for chemical process equipment can be between 0.020 inch and 0.065 inch thick, and the shell about an inch thick, depending on the ASME Code requirements.

To repair corrosion pits in the wall of chemical process equipment, holes between about 1/32 inch and 3/64 inch can be drilled through the liner and the shell, with the drill being centered on the corrosion pits. The hole through the liner is enlarged to a diameter which is greater than the diameter of the corrosion pits, e.g., about 1/16 inch. A tantalum screw having a minor diameter of 1/16 inch is threaded into the hole in the liner and lifts the liner away from the shell. The hole through the shell is enlarged to a diameter of between 23/32 inch to ¾ inch without injuring the liner. The tantalum screw is removed from the liner which is slightly deformed in the raised position, the area between the liner and shell is cleaned with a solvent cleaner and is wiped and dried. A first insert has tantalum as a base constituent and includes a first portion comprising a rod having a diameter no greater than 1/16 inch, and a second portion comprising a disc having a diameter between 23/32 inch and ¾ inch and a thickness between 0.030 inch and 0.065 inch. The first insert is inserted into the hole from the steel side and is positioned with the first portion protruding through the hole through the liner and the second portion abutting the liner. The areas adjacent to the first insert are evacuated and purged with an inert gas, and the first insert is welded to the liner to form a seal therebetween. A second insert having the same base constituent as the shell and a diameter between 23/32 inch and ¾ inch is inserted into the hole in the shell and is welded to the shell to form a seal therebetween and thereby repair the wall.

In this manner, repair was effected on a 98% sulfuric acid absorber which had corrosion attack and developed pinhole failures which were considered to be due to pit-type corrosion. The liner was Fansteel "63" Metal. Approximately sixty corrosion pits were repaired by this method which enabled the absorber to be repaired in the field without being dismantled. Previously, efforts were made in the field to remove areas of the liner which were perforated by corrosion pits and to weld tantalum patches over these areas, but severe contamination of the weld area occurred, particularly beneath the liner because of residual corrosion products.

The method of the present invention can also be employed to repair liners of the thermal expansion compensated type which are corrugated. A liner having an irregular contour can be accommodated, and the shape of the inserts can be contoured as desired. Additionally, the shell can be removed from the underside of the liner to expose the liner for inspection or repairs by using an end mill to cut a slot through the shell without injuring the liner. It would therefore be possible to repair clad equipment, such as Detaclad (a trademark of E. I. Du Pont de Nemours & Co.), roll bonded or brazed liners.

While this invention is susceptible of embodiment in many different forms, there is shown in the drawings and described herein in detail a preferred embodiment of the invention, with the understanding that the present disclosure is to be considered as an exemplification of the principles of the invention and is not intended to limit the invention to the embodiment illustrated.

We claim:
1. A method of repairing a wall which includes a layer of first material and a layer of second material each having one face in face-to-face relation with a face of the other layer, said layer of first material having an opposite face with a fault therein, comprising the steps of:
   creating a hole through said fault, said layer of first material and said layer of second material, said hole through said layer of first material having a diameter at least as great as the diameter of said fault;
   raising said layer of first material away from said layer of second material adjacent the hole by inserting and operating a lifting means into said hole;
   enlarging said hole through said layer of second material;
   removing said lifting means from said hole;
   positioning a first insert of a material of substantially the same base constituent as said first material into said hole, said insert having a first portion protruding through said hole through said layer of first material and a second portion in juxtaposition with said one face of said layer of first material;
   welding said first insert to said layer of first material to form a seal therebetween;
   positioning a second insert of a material of substantially the same base constituent as said second material into the enlarged portion of said hole; and
   welding said second insert to said layer of second material to form a seal therebetween to thereby repair said wall.

2. A method as defined in claim 1 wherein said wall is the wall of a vessel which is adapted to receive corrosive materials;
said layer of first material comprises the inside liner of said vessel, is corrosion resistant, and has tantalum as a base constituent;
said first insert comprises a material having tantalum as a base constituent; and
said layer of second material comprises the outside shell of said vessel.

3. A method as defined in claim 2 further including the steps of:
cleaning between the raised portion of said first material and the layer of second material adjacent to said hole to remove contaminants and impurities;
evacuating the areas inside said vessel adjacent to said first insert; and
purging said evacuated areas with an inert gas before welding said first insert to said layer of first material to provide an inert atmosphere for welding.

4. A method as defined in claim 2 wherein said lifting means comprises a tantalum screw having threads which engage and raise said layer of first material adjacent to said hole as said screw is turned.

5. A method as defined in claim 1 wherein said layer of second material and said second insert have substantially the same base constituent.

6. A method as defined in claim 1 wherein said hole through said fault, said layer of first material and said layer of second material is created by drilling a hole through said fault, said layer of first material and said layer of second material, and enlarging the hole through said layer of first material to a diameter at least as great as the diameter of said fault, whereby the diameter of the hole through said layer of first material is greater than the diameter of the hole through said layer of second material before the hole through said layer of second material is enlarged to limit the insertion of said lifting means into the hole.

7. A method as defined in claim 1 wherein said one face of said layer of first material is in interfacial contact with said one face of said layer of second material.

8. A method as defined in claim 1 wherein said one face of said layer of first material is in close proximity to said one face of said layer of second material.

* * * * *